United States Patent [19]
Payton

[11] 3,955,321
[45] May 11, 1976

[54] PROCESS FOR GROWING NOVEL PLANTS
[75] Inventor: Ralph R. Payton, Carmel Valley, Calif.
[73] Assignee: The Raymond Lee Organization Inc., a part interest
[22] Filed: Feb. 18, 1975
[21] Appl. No.: 550,648

[52] U.S. Cl. .................................... 47/58; 47/1 R; 47/6
[51] Int. Cl.² .................... A01G 1/06; A01B 79/00
[58] Field of Search ............. 47/58, 1, 6, 7, 8, 57.5; 119/4

[56] References Cited
UNITED STATES PATENTS

| | | | |
|---|---|---|---|
| 1,080,660 | 12/1913 | Sherman | 47/8 |
| 2,096,507 | 10/1937 | Czeszcziczki, Jr. | 47/58 |
| 2,126,024 | 8/1938 | Mikimoto | 119/4 |
| 2,921,409 | 1/1960 | Seifter | 47/58 |
| 3,039,230 | 6/1962 | Holmes et al. | 47/6 |
| 3,367,065 | 2/1968 | Cravens | 47/57.5 |
| 3,864,874 | 2/1975 | Norris et al. | 47/57.5 |

OTHER PUBLICATIONS
Anon., Science and Invention Magazine, Aug. 1927, p. 307, Vol. 15, "Practical Grafting Methods."
Anon., Washington Times Herald, Oct. 27, 1939, p. 18, "I'll Take Melon Waiter".
Fred J. Cook, The Unfinished Story of Alger Hiss, William Morrow Book Co., New York, 1958, p. 17.
Bert Andrews, A Tragedy of History, Pub. by Robert B. Luce, Washington D.C. 1962, Chapter 19, "The Suit" pp. 176, 177.
Ralph De Teledano et al., Seeds of Treason, Funk and Wagnalls Co., N.Y., pp. 217 and 218.
Meyer A. Zelig's Friendship and Fratricide, The Viking Press, N.Y., p. 352.

*Primary Examiner*—Edgar S. Burr
*Assistant Examiner*—James R. Feyrer

[57] ABSTRACT

A plug is withdrawn from the wall of a living pumpkin attached to its vine. A plastic bag is introduced into the hole thus formed. Foreign matter is inserted into the bag, and the bag is tied, and pushed entirely into the pumpkin. The plug is replaced, the pumpkin grown to maturity and subsequently harvested.

1 Claim, 4 Drawing Figures

PROCESS FOR GROWING NOVEL PLANTS

SUMMARY OF THE INVENTION

The invention is directed towards a method for producing mature living plant fruits, such as pumpkins, with foreign bodies inside them. These foreign bodies will be discovered only when the plant is cut open as on occasions such as Halloween.

Thus, a plug is cut from the wall of a living immature plant fruit attached to its vine. Into this fruit is placed the closed end of a plastic bag, which is filled with currency, coins or other foreign bodies, tied, and then pushed completely into the fruit through the hole left by the plug. The plug is subsequently replaced.

The fruit may then grow to ripeness, and the cuts surrounding the plug will heal, leaving a distinctive scar. When the fruit is removed from its vine and opened, the plastic bag and the foreign bodies therein will be discovered.

DETAILED DESCRIPTION OF PREFERRED EMBODIMENTS

Figure 1:
FIG. 1 shows the plants growing in a field.
Figure 2:
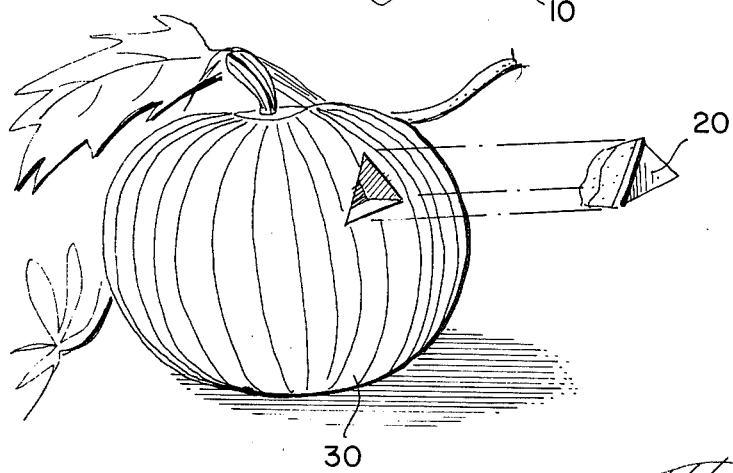
FIG. 2 shows the plug cut from the wall of the plant.
Figure 3:
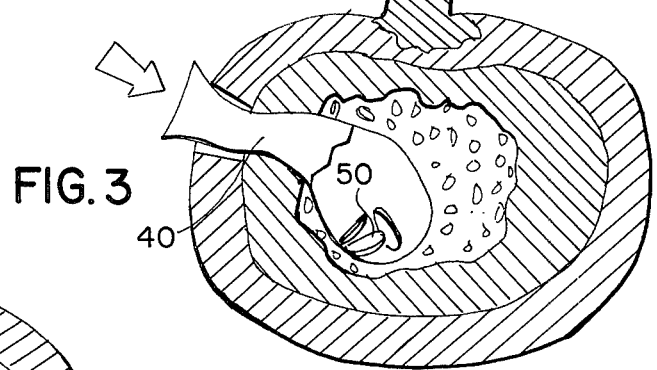
FIG. 3 shows the introduction of foreign bodies into the plant.
Figure 4:
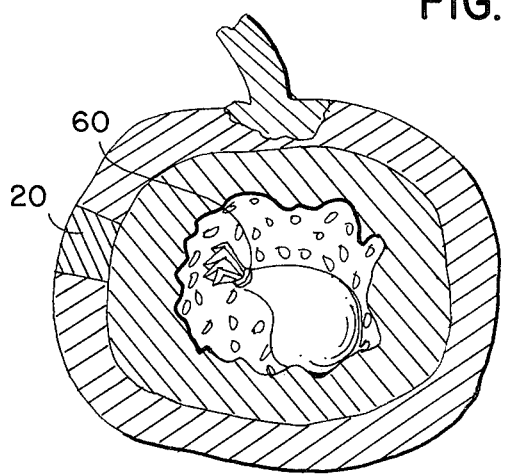
FIG. 4 shows a cross section of the mature plant ready for harvest.

Referring to the drawings, pumpkins 10 are grown in a field. A triangular plug 20 is removed from the wall of a living immature pumpkin 30, still attached to its vine, and a plastic bag 40 placed into the interior of the pumpkin through the hole thus produced. Coins 50 are placed in the bag, which is then closed with a rubber band 60. The plug is then replaced, and as is shown in FIG. 4, the pumpkin is grown to ripeness, with the plug healed in position.

The pumpkin is then removed from its vine, and subsequently opened at Halloween, when the bag and coins are discovered.

While the invention has been described with detailed reference to the drawings, the protection sought is to be limited only by the terms of the claims which follow.

I claim:

1. A process for introducing foreign bodies into the interior of pumpkins and like living plant fruits, comprising:

extracting a plug from the wall of the growing fruit when the fruit is in an immature stage of growth on its vine;

inserting an empty plastic bag into the interior of the fruit, leaving the open end of the bag outside;

placing the foreign bodies into the bag;

tying the open end of the bag;

pushing the tied end of the bag into the interior of the fruit;

replacing the plug in the wall of the fruit; and allowing the fruit to grow to a mature ripe stage of development and thus allowing the plug to reunite itself to the wall of the plant.

* * * * *